United States Patent [19]

Farrell et al.

[11] Patent Number: 5,713,035
[45] Date of Patent: Jan. 27, 1998

[54] LINKING PROGRAM ACCESS REGISTER NUMBER WITH MILLICODE OPERAND ACCESS

[75] Inventors: Mark Steven Farrell, Pleasant Valley; Barry Watson Krumm, Poughkeepsie; John Stephen Liptay, Rhinebeck; Charles Franklin Webb; Steven QiHong Ying, both of Poughkeepsie, all of N.Y.

[73] Assignee: International Business Machines Corporation, Armonk, N.Y.

[21] Appl. No.: 414,164

[22] Filed: Mar. 31, 1995

[51] Int. Cl.$^6$ ................................................ G06F 12/00
[52] U.S. Cl. ........................ 395/800; 395/401; 395/410
[58] Field of Search .......................... 395/800, 375, 395/401, 376, 482

[56] References Cited

U.S. PATENT DOCUMENTS

| | | | |
|---|---|---|---|
| 4,430,705 | 2/1984 | Cannavino et al. | 364/DIG. 1 |
| 4,901,233 | 2/1990 | Liptay | 364/DIG. 1 |
| 4,979,098 | 12/1990 | Baum et al. | 395/418 |
| 5,023,773 | 6/1991 | Baum et al. | 364/DIG. 1 |
| 5,220,669 | 6/1993 | Baum et al. | 395/678 |
| 5,226,164 | 7/1993 | Nadas et al. | 395/800 |
| 5,280,593 | 1/1994 | Bullion, III et al. | 395/375 |
| 5,295,251 | 3/1994 | Wakui et al. | 395/400 |
| 5,355,461 | 10/1994 | Wakui et al. | 395/400 |
| 5,390,312 | 2/1995 | Chiarot et al. | 395/400 |
| 5,481,684 | 1/1996 | Richter et al. | 395/375 |
| 5,481,693 | 1/1996 | Blomgren et al. | 395/375 |
| 5,560,035 | 9/1996 | Garg et al. | 395/800 |
| 5,574,927 | 11/1996 | Scantlin | 395/800 |

OTHER PUBLICATIONS

IBM/TDB vol. 35 Nov. 4A Sep. 1992; 451–454: Milli–code (Bullion, Chang, Meltzer, Nadas, Pedersen).

*Primary Examiner*—Alyssa H. Bowler
*Assistant Examiner*—Walter D. Davis
*Attorney, Agent, or Firm*—Lynn L. Augspurger; Laurence J. Marhoefer

[57] ABSTRACT

In a milli-mode processor, bits (0–6) of an access list entry token (ALET) in the program access register must be zeros in order for access register translation to be successful. When the ALET is being copied from a program access register to a millicode access register, bits 0–3 of ALET, written into the millicode access register, are set to the access register number of the program access register from which the data is being read. This establishes the affinity between the program access register number and any logical fetches which might be attempted by millicode.

8 Claims, 4 Drawing Sheets

LINKING PROGRAM ACCESS REGISTER NUMBER WITH MILLICODE OPERAND ACCESS

BACKGROUND OF THE INVENTION

1. Field of the Invention

This invention relates to improvements in pipelined computer processors that execute relatively simple instructions in hardware controlled execution units and execute relatively complex instructions in a milli-mode architected state with vertical microcode (i.e. millicode) routines executing in the same hardware controlled execution units. More particularly, this invention relates to a system for correlating a general purpose access register number with a millicode operand access.

2. Cross Reference to Related Applications

The present United States patent application is related to the following copending United States patent applications which are assigned to the assignee of the present application, and which are incorporated herein by reference.

Application Ser. No. 08/414,154, filed Mar. 31, 1995, entitled "Specialized Millicode Instruction."

Application Ser. No. 08/414,821, filed Mar. 31, 1995, entitled "Millicode Read-Only Storage With Entry Point Patch Control."

Application Ser. No. 08/414,977, filed Mar. 31, 1995, entitled "Hardware Retry Trap for Millicoded Processor."

Application Ser. No. 08/414,158, filed Mar. 31, 1995, , entitled "Addressing Extended Memory Using Millicode."

Application Ser. No. 08/414,812 , filed Mar. 31, 1995, entitled "Mapping Processor State Into A Millicode Addressable Processor State Register Array."

Application Ser. No. 08/414,975 , filed Mar. 31, 1995, entitled "Priority and Recovery Method For Serialization of System Quiesce State."

3. Description of the Prior Art

Instruction sets used in computer systems employing so-called Complex Instruction Set Computing (CISC) architecture include both simple instructions (e.g. Load, or Add) and complex instructions (e.g. Program Call, or Load Address Space Parameters). As an example to which the invention has particular relevance, see "IBM Enterprise Systems Architecture/390 Principles of Operation" (Publication No. SA22-7201-02, available from IBM Corporation, Armonk, N.Y.), which is incorporated herein by reference in its entirety. As these computer systems (e.g. IBM System 390) have become more powerful, larger percentages of the instruction set have been implemented using hardware execution units to increase the systems performance. Conventionally, the complex functions are implemented in microcode because building hardware execution units to execute them is expensive and error prone.

Implementing complex functions in microcode provides flexibility to fix problems and expandability in that additional functions can be included later. In certain prior art machines, where much of the processor is hardware controlled, a dedicated microprocessor based execution unit is often provided in order to implement the complex functions. This unit can be microprogrammed to execute complex instructions and complex functions such as handling interrupt conditions.

More recently, prior art proposals have been advanced for machines with a so-called milli-mode operating capability; see, for example, IBM Technical Disclosure Bulletin Vol. 35, No. 4A of September 1992, incorporated herein by reference, and U.S. Pat. Nos. 5,280,593 and 5,226,164 assigned to the assignee of this invention and also incorporated herein by reference.

A milli-mode operation enables implementation of complex functions in a large, hardware controlled, pipelined, general purpose digital computer without a microprocessor. Milli-mode implements these complex functions with the flexibility provided by firmware and avoids a packaging problem introduced by the inclusion of microprocessor hardware. Rather than a microprocessor, milli-mode uses the preexisting dataflow and hardware controlled execution units of a pipelined processor to accomplish complex functions. Additional hardware controlled instructions (private milli-mode only instructions) are added to provide control functions or to improve performance. These private milli-mode instructions augment the architected instruction set. Milli-mode routines can intermingle the milli-mode only instructions with architected instructions to implement complex functions.

Milli-mode detection logic in the instruction decode logic detects the requirement to enter milli-mode, and this causes millicode routines to be fetched. The millicode routines are decoded by the decoder hardware and dispatched for execution in the same way as the architected macro-instructions (system-mode instructions).

Practically all of the architected macro-instructions that are implemented as hardware controlled instructions can be executed in milli-mode. The set of instructions available in milli-mode can be considered to be an alternate architecture that the processor can execute.

The "IBM Enterprise Systems Architecture/390 Principles of Operation" (Publication No. SA22-7201-02, available from IBM Corporation, Armonk, N.Y.), which is incorporated herein by reference in its entirety, describes access registers and access register translation. During an operand fetch or an operand store operation, when the processor is in an access register mode specified by the program status word, an access register is used to store an access list entry token (ALET). The access register number is specified by the base register specification of the operand address. The access register stores a segment table designator, which is used in the process of segment and page translation for the operand address. The access list entry token is 32 bits, with bits 0–6 specified by the architecture to be all zeros, or if not all zeros, an access list entry token specification exception program interruption results and translation is suppressed.

When a translation exception occurs in the access register mode, the logical address that initiated the request is stored into assigned storage locations in the prefix area of the assigned storage location obtained by translation along with the number of the access register used for the translation. Also, if a program event recording (PER) storage alteration event is detected during a store type operation, the access register number is again required to be stored into an assigned storage location in the prefix area.

In a processor where the central processor licensed code (LIC) is implemented in millicode, there are separate sets of general purpose registers (GPRs) and access registers (ARs) for use by the ESA/390 program and for use by millicode. Instructions that are issued by the ESA/390 program that are directly executed by hardware use the "program" GPRs and access registers directly. When the ESA/390 program issues an instruction that is executed by millicode, the information that is contained in the program GPRs and access registers must be available for use by the millicode in the millicode GPRs and access registers.

When running in millicode, there is no fixed correlation between the GPR and access register numbers that contained the data in the program registers, and the register numbers being used by the millicode. Therefore, when the millicode issues an instruction that needs translation via access register translation, and a translation exception is encountered, there is no direct correlation of the access register number that was used by millicode to the number of the program access register that held the associated data. It is the program access register number that needs to be stored into the prefix area during a translation exception.

Likewise, when the millicode issues a store request that generates a PER storage alteration event, there is no direct correlation between the millicode access register number used for the request and the program access register number with which the store request is architecturally associated.

An object of this invention is the provision of a system to transfer and correlate the contents of the program access register into the millicode's access register without typically requiring explicit millicode action.

Briefly, this invention makes use of the fact that bits 0–6 of the access list entry token (ALET) in the program access register must be zeros in order for access register translation to be successful. When the ALET is being copied from a program access register to a millicode access register, bits 0–3 of ALET, written into the millicode access register, are set to the access register number of the program access register from which the data is being read. This establishes the affinity between the program access register number and any logical fetches which might be attempted by millicode. Also, to keep track of the original value of bits 0–6 of the program access register, bit 4 of the data written into the millicode access register indicates the state of these bits of the original ALET. If bits 0–6 of the original ALET in the program access register are all zeros, then bit 4 of the ALET copied into the millicode access register is set to a zero. If any of bits 0–6 of the original ALET is a one, then bit 4 of the ALET copied into the millicode access register is set to a one.

When a logical storage access is initiated by millicode, the ALET associated with the millicode instruction's base address is sent to the hardware translation logic. If the request is tagged as an access register request, then access register translation is initiated. If bit 4 of the ALET data sent from the millicode access register is a one, then an ALET-specification exception program interruption is presented. If bit 4 is a zero, then the program access register number (bits 0–3) is retained and the translation process proceeds. If any translation exception is encountered, or if a PER storage alteration event is detected, then this retained program access register number can now be used in the program interrupt millicode for presentation of an access register number in the defined location in the prefix area.

For ease of implementation, a similar modification of the ALET is made by processor hardware when storage accesses are made directly by the ESA/390 program, rather than by millicode. When the storage request is made, bits 0–3 of the data sent to the translator hardware contain the access register number of the access register specified by the instruction; and bit 4 of the data is the mapping of bits 0–6 of the ALET being all zeros or not. In this manner, the translation sees the same information regardless of whether the request was made directly by the ESA/390 program or by millicode.

When entering milli-mode for an ESA 390 instruction, hardware loads into a defined millicode GPR the operand address of an ESA/390 instruction requiring millicode execution. The operand address is calculated from the instruction's base and displacement. The hardware also puts into a defined millicode access register the ALET contents associated with the program access register, as specified by the ESA/390 instruction's base register. Another method of getting the program's ALET into a millicode access register is by the millicode explicitly reading the program access register into a millicode access register. There are two millicode instructions that will read the program ALET into a millicode access register. One of these instructions reads a specific program access register as specified by an operand of the millicode instruction (EXAR—extract access register); and the other instruction reads a program access register as indicated by a level of indirection, which is a four bit tag that is set to the program instruction's base address when the instruction is being passed to the millicode (EXARI—extract access register indirect).

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

This following exemplary embodiment of the invention is applicable in the overall context of a system generally conforming to IBM 390 system architecture. A more detailed description of the conventional elements of such a 390 system processor can be found, for example, in U.S. Pat. No. 4,901,233 to John S. Liptay, assigned to the same assignee as the present invention, and incorporated by reference, in its entirety, as if printed in full below. While the System 390 environment will be used as an example, it should be understood that the present invention is also readily applicable to other IBM (e.g. IBM System 370) and non-IBM architectures as well.

While not limited thereto, the invention is particularly well suited for use in conjunction with the enhanced error recovery system described in copending application, attorney docket P09-93-035, Ser. No. 08/149,260, filed Nov. 9, 1993, assigned to the assignee of this application, and also incorporated herein by reference.

Figure 1:
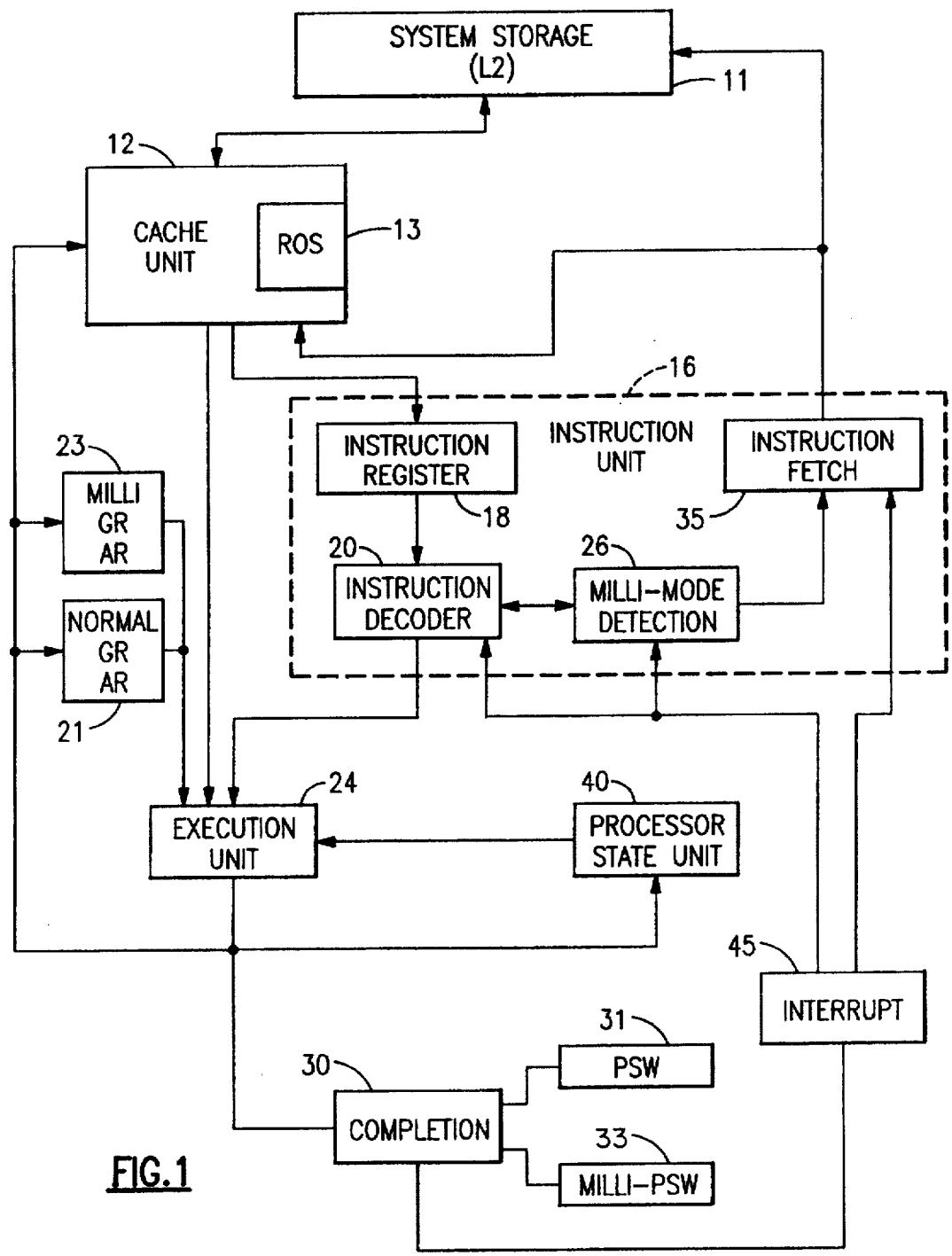
FIG. 1 is a block diagram illustrating the components of a millicode system in accordance with a preferred specific embodiment of the invention.

Referring now to FIG. 1, elements of a system relevant to this invention include a system storage 11, and a cache memory unit 12. The system storage 11 contains the instructions that the processor is executing as well as the data those instructions are manipulating. The cache memory unit 12, which includes a copy of the data and instructions the processor is presently executing, in this preferred embodiment is a split cache providing interleaved double word addressing. The cache memory 12 logically includes a contiguously addressable read only store 13, in which code for executing certain frequently invoked milli-mode routines is stored.

An instruction unit subsystem 16 includes an instruction buffer (not shown in FIG. 1), instruction registers 18 and an instruction decoder 20. The instruction unit subsystem receives macro-instructions, millicode instructions, and data from the cache memory unit 12. Instructions are parsed and placed into the instruction registers 18. The decoder 20 reads the contents of the instruction registers 18, decodes the instruction (or causes an operation exception), and passes the instruction to an instruction queue for sequential execution by a hardware execution unit 24. Each hardware execution unit 24 has access to a set of general purpose registers and access registers 21 for normal macro-code instruction execution and to a set of general purpose registers and access registers 23 for millicode instruction execution. Control logic controls the exchange of data between the two sets of registers when beginning or terminating a millicode routine.

Milli-mode detection logic 26 is coupled to the instruction registers and detects when a macro-instruction, which is being decoded, is of a type that is to be interpreted in a milli-mode operation. When this occurs, the milli-mode detection logic 26 generates an entry point address and passes this address along to the instruction fetch control logic 25 and places the decoder 20 into a milli-mode operating state. In this state the decoder is enabled to decode milli-mode instructions. Milli-mode instructions are vertical microcode, consisting of a mixture of regular microcode instructions and special milli-mode only instructions, all of which can be executed in the execution unit 24. The special instructions provide control functions needed by the millicode routines. The set of millicode routines reside outside of the program addressable storage.

The system effects of an executed instruction are architecturally visible in the completion logic 30. Signal lines between the completion logic 30 and the decoder 20 allow the decoder 20 to keep track of instruction completion. A program status word (PSW) in register 31 controls execution of the macro-program. Similarly, the system also includes a milli-PSW register 33, which controls execution of the milli-routine. Both the execution unit 24 and the completion logic 30 are connected to read from/write to the PSW and the milli-PSW registers. Thus, at any given point the execution units or the completion logic can read or update the appropriate one of the PSW and/or milli-PSW registers. A processor state unit 40 maintains the entire updated status of the architected system both in regular mode and milli-mode operation. In the event of a detected error, the processor state unit 40 provides a resource to recreate the status of the system from a check point state in order to allow a retry of the error causing operation.

Milli-mode is enabled when the milli-mode detection logic 26 recognizes that the macro-instruction being decoded is to be implemented with millicode. In response to this recognition, the detection logic 26 signals the decoder 20, the instruction fetch controls 35 and register controls in the execution unit 24. In response to the milli-mode recognition signal from the detection logic 26, the decoder 20 suspends macro-mode decoding, the execution unit register control copies the contents of the GPRs 21 to the milli-registers 23 and causes the system to subsequently use the milli-registers 23. The milli-mode detection logic 26 generates a millicode entry point address.

The entry point address (generated by the milli-mode detection logic 26) is used by the control logic 35 to address the cache 12. Milli-instructions from the cache are sent to the instruction registers 18 where the decoder 20 decodes them and schedules them for execution.

When the processor enters milli-mode, it executes and completes the macro-instructions already in the pipeline conceptually prior to the instruction that caused entry into milli-mode. As the processor completes the macro-instructions, it updates the appropriate GPRs. At the same time, the processor decodes and executes the milli-instructions that implement the macro-instruction that caused entry into milli-mode.

At some point the macro-instruction immediately prior to the instruction that caused entry to milli-mode will be indicated completed in the completion logic 30. Only then does the processor begin to complete the milli-instructions. The processor then continues decoding, executing and completing the milli-instructions.

Eventually, the detection logic 26 recognizes a millicode END (MEND) milli-instruction. When the detection logic 26 detects a MEND milli-instruction, it causes the processor to cease fetching milli-instructions. Further, when MEND is detected, the detection logic puts the decoder in macro-mode and causes the processor to begin fetching macro-instructions. Millicode explicitly updates all registers, so there is no transfer of register content when going from milli-mode operation to regular operation.

Completion of a MEND milli-instruction causes the processor completion logic to begin completing macro-instructions.

The processor can also enter milli-mode in response to an interrupt. When the completion logic detects an interrupt, the interrupt priority logic 45 determines that an interrupt is to be serviced and it signals the instruction fetch unit, causing the decoder to initiate milli-mode. The recognition of an interruption condition causes the processor to halt macro-mode execution at the next interruptible point. The interrupt priority logic 45 also generates control inputs which are used by the milli-mode detection logic to generate an entry point address with which to address the cache. These milli-instructions are sent to the instruction registers where the decoder decodes them and schedules them for execution at the appropriate hardware execution elements.

The processor proceeds to decode, execute and complete the milli-instruction in the milli-routine for interrupts. Eventually, the decoder recognizes a MEND milli-instruction. This causes the decoder to stop decoding in milli-mode. Depending on whether or not there are additional interrupts that require servicing, the decoder hardware will either redo the interrupt process or return to decoding macro-instructions from the cache.

When entering milli-mode for an ESA/390 instruction, execution hardware 24 loads into a defined millicode general purpose registers 23 the operand address of an ESA/390 instruction requiring Millicode execution. The operand address is calculated from the ESA/390 instruction's Base and Displacement. The hardware 24 also puts into a defined one of the millicode access registers, also labelled 23, the access list entry token associated with a specific one of the program access registers 21, which is specified by the ESA/390 instruction's base register. It will be appreciated that an ESA/390 instruction to be executed by a millicode sequence may specify two storage operands and an access list entry token is calculated for each operand storage register.

An alternative method of transferring the program's access list entry token into a millicode access register is to have millicode explicitly read the access list entry token from a program access register into a millicode access register. There are two millicode instructions needed to read the program access list entry token into a millicode access register. One of these instructions (EXAR—Extract Access Register) reads a specific program access register as specified by an operand of the millicode instruction; and the other instruction (EXARI—Extract Access Register Indirect) reads a program access register as indicated by a level of indirection, i.e. a four bit tag that is set to the program instruction's base address when the instruction is being passed to the millicode.

Figure 2:
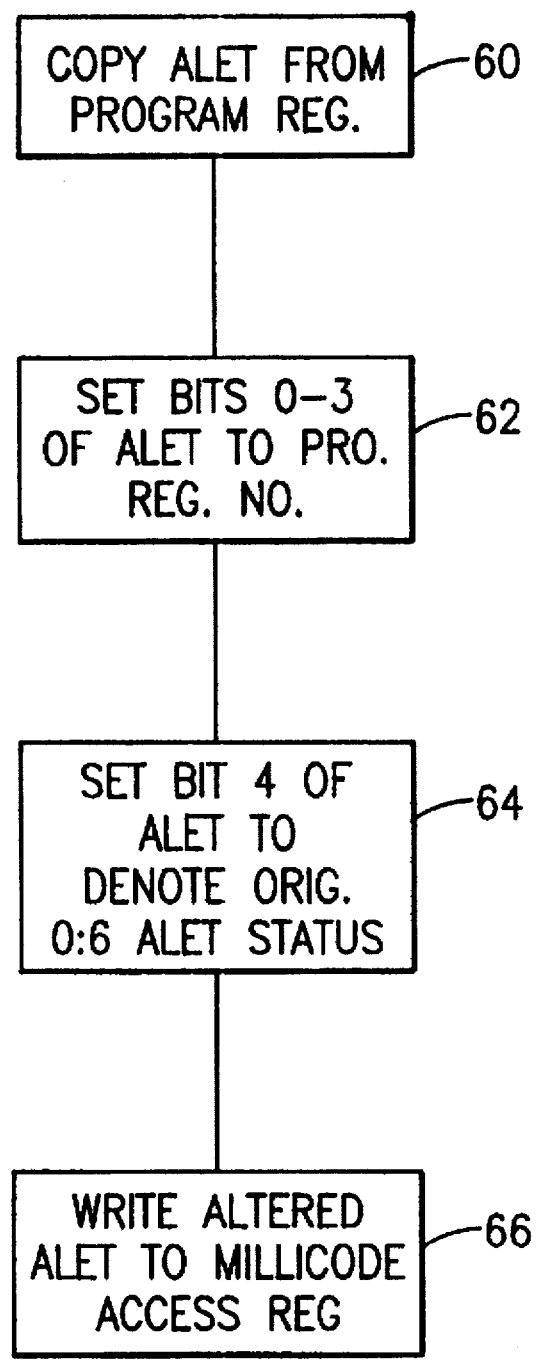
FIG. 2 is a flow diagram of the steps in correlating the program register number with an access list entry token transferred to a millicode access register.

Referring to FIG. 2, this invention makes use of the fact that bits 0–6 of the 32-bit access list entry token stored in the program access register must be zeros in order for access register translation to be successful. Hardware 24 copies the access list entry token from a program access register (block 60) and sets (block 62) bits 0–3 of access list entry token to the access register number of the program access register from which the data is being read. Also, to keep track of the original value of bits 0–6 of the program access register, bit 4 of the data written into the millicode access register is set (block 64) to indicate the state of these bits of the original access list entry token. If bits 0–6 of the original access list entry token in the program access register are all zeros, then bit 4 of the access list entry token copied into the millicode access register is set to a zero. If any of bits 0–6 of the original access list entry token is a one, then bit 4 of the access list entry token copied into the millicode access register is set to a one. The thusly altered access list entry token is written into the millicode access register, block 66. This establishes an affinity between the program access register number and any logical fetches which might be attempted by millicode.

When a logical storage access is initiated by millicode, the access list entry token associated with the millicode instruction's base address is sent to the hardware translation logic. If the request is tagged as an access register request, then access register translation is initiated. If bit 4 of the access list entry token data sent from the millicode access register is a one, then an access list entry token specification exception program interruption is presented. If bit 4 is a zero, then the program access register number (bits 0–3) is retained and the translation process proceeds. If any translation exception is encountered, or if a PER storage alteration event is detected, then this retained program access register number can now be used in the program interrupt millicode for presentation of an access register number in the defined location in the prefix area.

For ease of implementation, a similar modification of the access list entry token is made when storage accesses are made directly by the ESA/390 program, rather than by millicode. When the storage request is made, bits 0–3 of the data sent to the translator hardware contain the access register number of the access register specified by the instruction; and bit 4 of the data is the mapping of bits 0–6 of the access list entry token being all zeros or not. In this manner, the translation sees the same information regardless of whether the request was made directly by the ESA/390 program or by millicode.

Following are definitions of the millicode instructions Extract Program Access Register (EXAR) and Extract Program Access Register Indirect (EXARI), which are used as part of this invention.

Extract Program Access Register

EXAR R1, R2

| EXAR | ///////////// | R1 | R2 |
|---|---|---|---|
| 8 | 16 | 24 | 28  31 |

The millicode access register specified by R1 is loaded from the program access register specified by R2.

Figure 3:
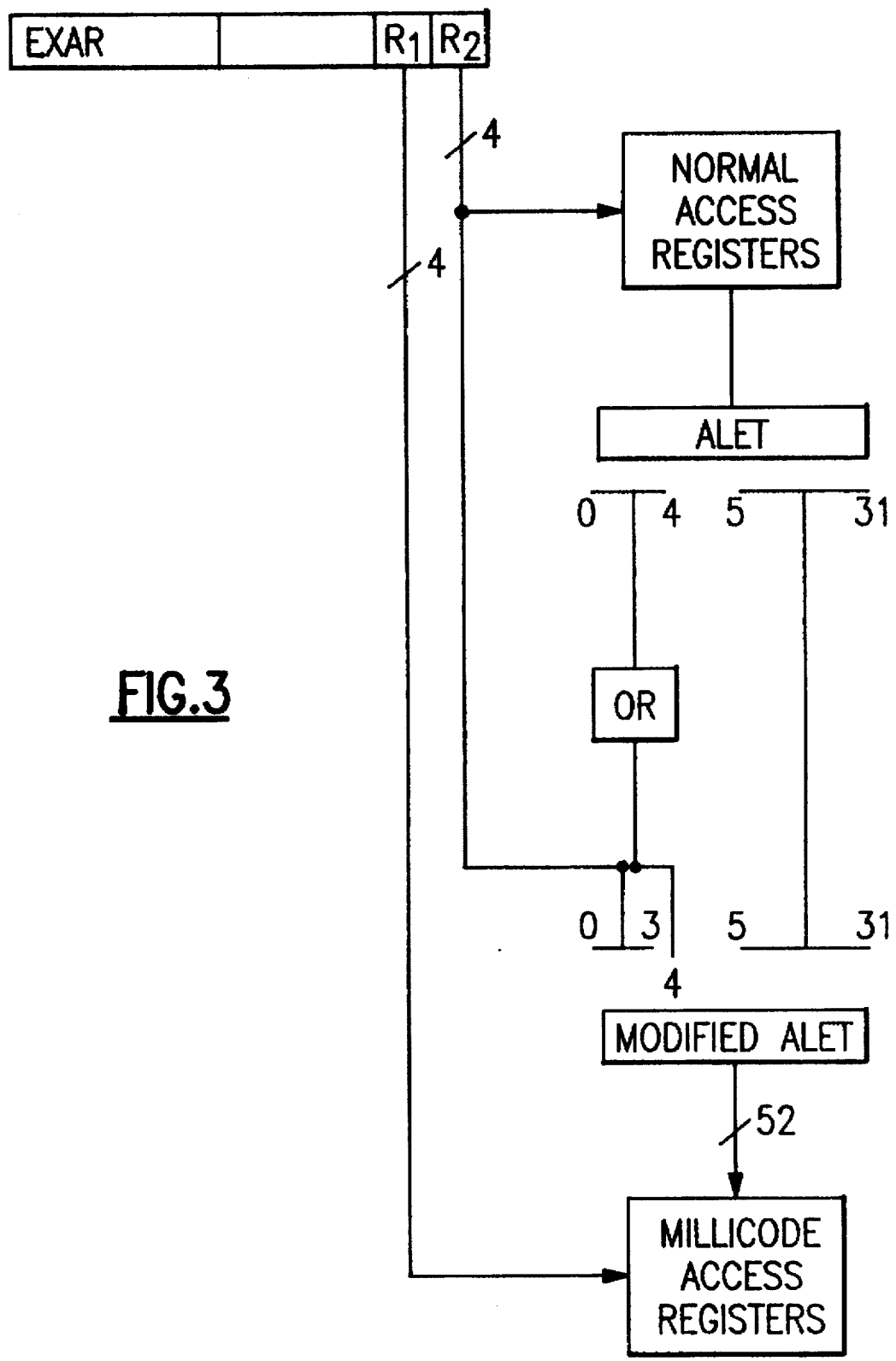
FIG. 3 is a block diagram illustrating the operation of an EXAR instruction.

As illustrated in FIG. 3, the value loaded in millicode access register R1 is modified to support identification of the address space for a PER event or translation exception. Bits 0:3 of millicode access register R1 are set to the access register number of the program register from which the value is taken (i.e. R2). Bit 4 of millicode access register R1 is set to the OR function of bits 0:6 of program access register R2. Since the ESA/390 architecture requires these bits to be zero when used as an access list entry token, no useful information is lost by compressing these bits into a single bit in the millicode access register. Bits 5:6 of millicode access register R1 are set to '00'.

There is no special handling of access register 0; that is, if R2='0', the contents of program access register 0 are loaded into millicode access register R1. Upon millicode entry, register numbers referenced by ESA/390 instructions are loaded into a set of registers denoted "Register Indirect Tags." These tags may be used by millicode to access registers specified by ESA 390 instruction without examining register number.

Extract Program Access Register Indirect

EXARI R1, R2

| EXARI | ///////////// | R1 | R2 |
|---|---|---|---|
| 8 | 16 | 24 | 28  31 |

This instruction operates identically to extract program access register except that R2 specifies a register indirect (RI) tag, and the contents of the selected tag are used to specify the program access register from which the millicode access register is to be loaded.

Figure 4:
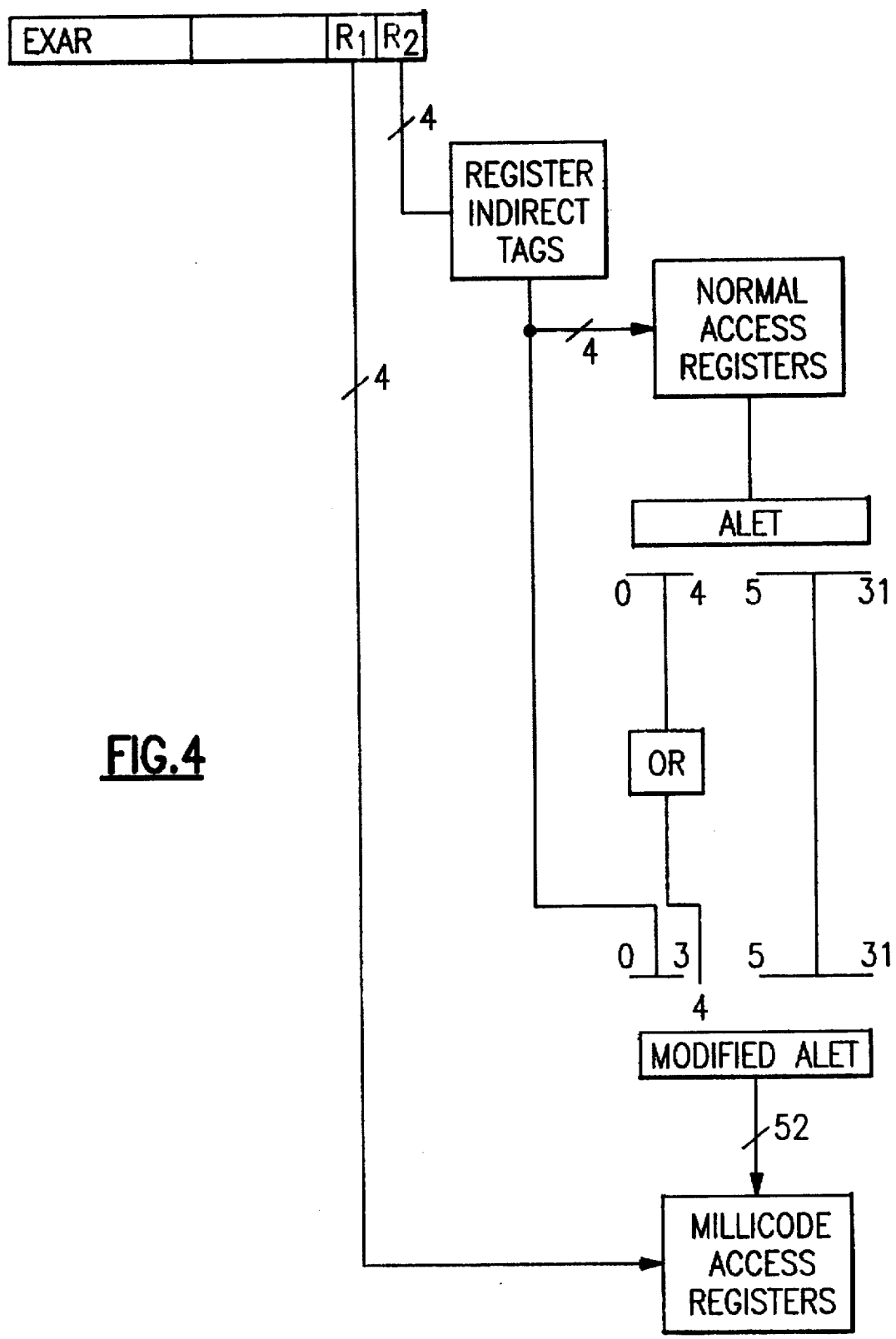
FIG. 4 is a block diagram illustrating the operation of an EXARI instruction.

As illustrated in FIG. 4, the value loaded into millicode access register R1 is modified to support identification of the address space for a PER event or translation exception. Bits 0:3 of millicode access register R1 are set to the access register number of the program register from which the value is taken (i.e. to the value of the RI tag selected by R2). Bit 4 of millicode access register R1 is set to the OR of bits 0:6 of the program access register selected. Since the ESA/390 architecture requires these bits to be zero when used as an access list entry token, no useful information is lost by compressing these bits into a single bit in the millicode access register. Bits 5:6 of millicode access register R1 are set to '00'.

If the RI tag indicates access register 0, a value of zero is loaded in millicode access register R1 rather than the contents of program access register 0.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. In a pipelined computer processor, which executes a relatively simple instruction set in a hardware controlled execution unit and executes a relatively complex instruction set in a milli-mode architected state with a millicode sequence of simple instructions in said hardware controlled execution unit, a milli-mode method for correlating an identifying number of a program access register with data transferred from the program access register to a millicode access register, comprising the steps of:

reading an access list entry token stored in said program access register;

modifying a field of said access list entry token to include said identifying number of said program access register; and storing said access list entry token modified in said modifying step in said millicode access register.

2. A method as in claim 1 including a further step of combining certain bits in said field in a logical operation and inserting the result of said logical operation step in said access list entry token stored in said storing step.

3. A method as in claim 1 wherein said reading step is in response to a millicode instruction with a first field specifying said access list entry token stored in said program access register and a second field which specifies said identifying number.

4. A method as in claim 1 wherein said reading step is in response to a millicode instruction with a first field specifying said access list entry token stored in said program access register and a second field which specifies a selection value which is used to select said identifying number from a plurality of access register identifiers.

5. In a pipelined computer processor, which executes a relatively simple instruction set in a hardware controlled execution unit and executes a relatively complex instruction set in a milli-mode architected state with a millicode sequence of simple instructions in said hardware controlled execution unit conforming to the IBM Enterprise Systems Architecture/390, a milli-mode method for correlating an identifying number of a general purpose access register in a computer system which employs access registers and access register translation with data transferred from the general purpose access register to a millicode access register, comprising the steps of:

reading an access list entry token from said general purpose access register;

modifying bits 0–6 of the access list entry token to indicate said identifying number of the general purpose access register; and storing the access list entry token, as modified in said modifying step, in said millicode access register.

6. A method as in claim 5 including the further step of combining bits 0–6 of said access list entry token in an OR operation, and storing the result of said OR operation step in said access list entry token stored in said storing step.

7. A method as in claim 5 wherein said reading step is in response to a millicode instruction with a first field specifying said access list entry token stored in said general purpose access register and a second field which specifies said identifying number.

8. A method as in claim 5 wherein said reading step is in response to a millicode instruction with a first field specifying said access list entry token stored in said general purpose access register and a second field which specifies a selection value which is used to select said identifying number from a plurality of general purpose access register identifiers.

* * * * *